(12) United States Patent
Choi (10) Patent No.: US 9,710,163 B2
(45) Date of Patent: Jul. 18, 2017

(54) METHOD AND APPARATUS FOR INPUTTING CHARACTERS

(71) Applicant: Samsung Electronics Co., Ltd., Gyeonggi-do (KR)

(72) Inventor: Gyu-Cheol Choi, Gyeongsanbuk-do (KR)

(73) Assignee: Samsung Electronics Co., Ltd (KR)

( * ) Notice: Subject to any disclaimer, the term of this patent is extended or adjusted under 35 U.S.C. 154(b) by 166 days.

(21) Appl. No.: 14/196,623

(22) Filed: Mar. 4, 2014

(65) Prior Publication Data

US 2014/0247224 A1  Sep. 4, 2014

(30) Foreign Application Priority Data

Mar. 4, 2013 (KR) ................. 10-2013-0022862

(51) Int. Cl.
*G06F 3/023* (2006.01)
*G06F 3/0489* (2013.01)
*G06F 3/0488* (2013.01)

(52) U.S. Cl.
CPC ...... *G06F 3/04895* (2013.01); *G06F 3/04886* (2013.01)

(58) Field of Classification Search
CPC .............. G06F 3/0233; G06F 3/04886; G06F 3/04895; G06F 3/0484; G06F 3/0488
See application file for complete search history.

(56) References Cited

U.S. PATENT DOCUMENTS

| | | | | |
|---|---|---|---|---|
| 6,286,064 B1* | 9/2001 | King | ................. | G06F 3/0238 341/22 |
| 2007/0155369 A1* | 7/2007 | Jobs | .................... | G06F 3/0233 455/414.1 |

FOREIGN PATENT DOCUMENTS

| | | |
|---|---|---|
| EP | 2383641 | 11/2011 |
| KR | 20100042998 | 4/2010 |

* cited by examiner

*Primary Examiner* — Ram Mistry
(74) *Attorney, Agent, or Firm* — The Farrell Law Firm, P.C.

(57) ABSTRACT

A method and apparatus for inputting characters in a terminal are provided. The method includes receiving a first key input through a key input unit; storing at least one character corresponding to the first key input; displaying the stored at least one character in a first display area; removing the displayed at least one character from the first display area in response to a second key input received through the key input unit; displaying the removed at least one character in a second display area; receiving input of a selection of at least one character that is displayed in the second display area; and displaying the selected at least one character in the first display area.

16 Claims, 10 Drawing Sheets

METHOD AND APPARATUS FOR INPUTTING CHARACTERS

PRIORITY

This application claims priority under 35 U.S.C. §119(a) to a Korean Patent Application filed in the Korean Intellectual Property Office on Mar. 4, 2013 and assigned Serial No. 10-2013-0022862, the entire content of which is incorporated herein by reference.

BACKGROUND OF THE INVENTION

1. Field of the Invention

The present invention relates generally to a method and apparatus for inputting characters, and more particularly, to a character input method and apparatus for allowing a user to correct mistyped characters.

2. Description of the Related Art

In recent years, the number of various services and additional functions provided by mobile derives has gradually increased. In order to increase the utility of these mobile devices and satisfy various needs of users, a variety of applications that can be executed in the mobile devices have been developed.

Such applications can be classified into default applications that are developed or provided by the manufacturer of the mobile devices and installed in the mobile devices, and additional applications that can be downloaded, such as from application sales websites over the Internet. The additional applications may be developed by general developers and registered in application sales websites. Therefore, various entities may be able to provide their applications, through application sales websites, to users of the mobile devices. Accordingly, tens to hundreds of thousands of free or paid applications may be provided to the currently available mobile devices depending on their specifications.

As messaging applications and social media applications become increasingly popular, users of mobile devices may often input (i.e., enter or type) characters (or text) on the mobile devices. In line with these trends, a variety of character input applications have been developed to provide an environment to input characters. However, there is still a need for new ways for users to more quickly and conveniently input characters.

FIGS. 1A to 1D illustrate an example of a character input method.

Figure 1A:
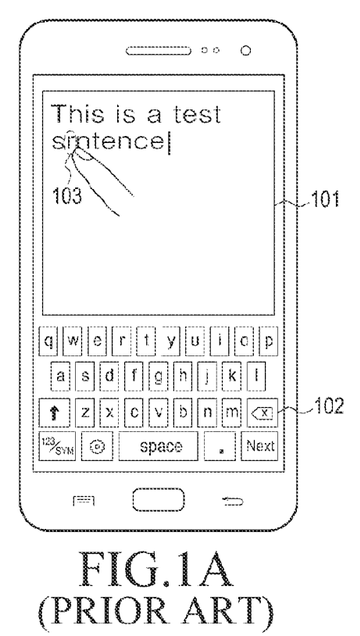
FIGS. 1A to 1D illustrate an example of a character input method.
Figure 1B:
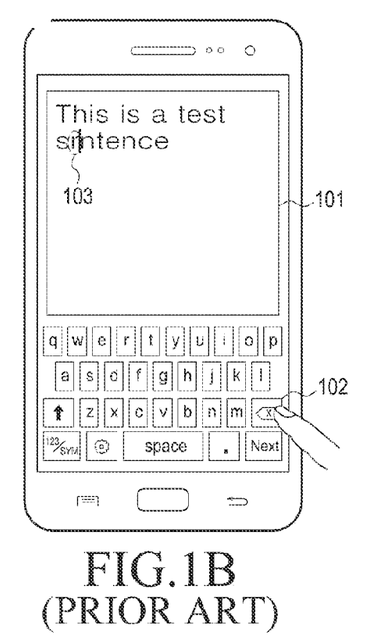
Figure 1C:
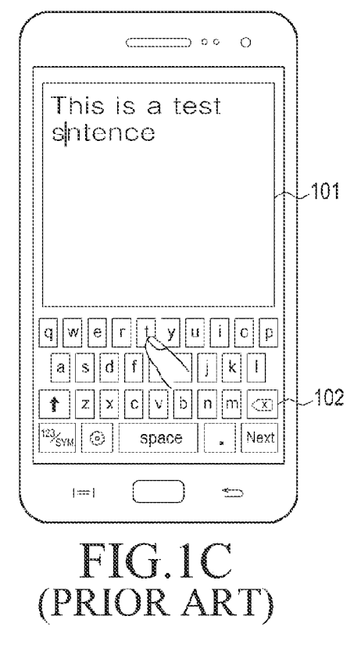
Figure 1D:
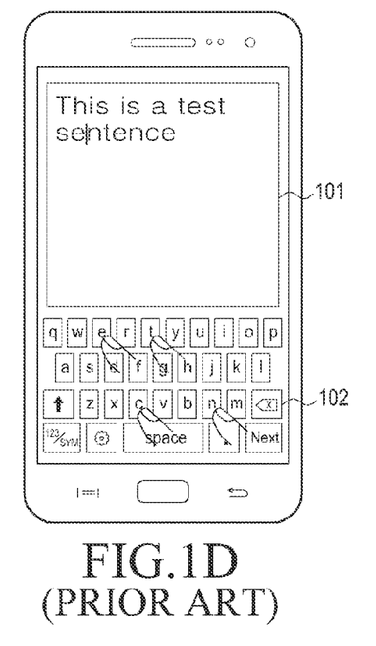

Referring to FIG. 1A, as a user inputs characters in a character input window 101 using a keypad displayed on a mobile terminal, when the user finds a mistyped character to be corrected, the user moves a cursor to the rear of the mistyped character 103, as shown in FIG. 1B. Thereafter, the user deletes the mistyped character 103, by inputting a key (e.g., a backspace key) 102 having a function of deleting characters, as illustrated in FIG. 1C. Next, as illustrated in FIG. 1D, the user inputs the correct character, completing the character correction.

However, when correcting characters in this way, the user touches a character input window in which a mistyped character is displayed, and moves the cursor to the rear of the mistyped character, by using the arrow keys or touching the target with his/her fingertip, in a keypad input mode, thereby causing a delay in inputting characters, and further inconveniencing the user by requiring the user to move the cursor. Since the user needs to touch the character input window and move the cursor to the target position in order to perform the correction, the user may have difficulty in moving the cursor to a desired position. This problem becomes greater due to the trend of increased resolution in new display devices, which reduces the gap between characters on a display.

FIGS. 2A to 2D illustrate another example of a character input method.

Figure 2A:
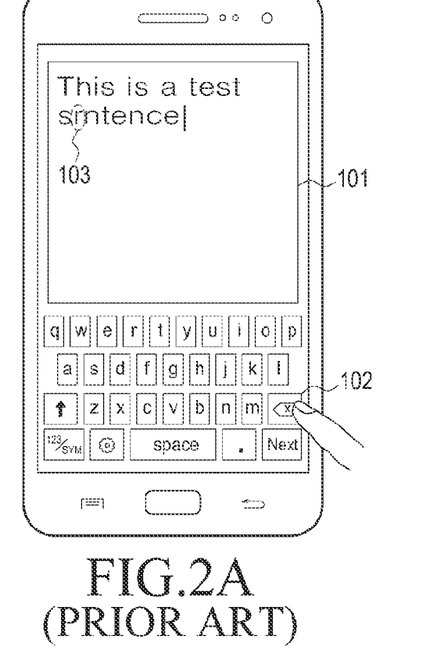
FIGS. 2A to 2D illustrate another example of a character input method.
Figure 2B:
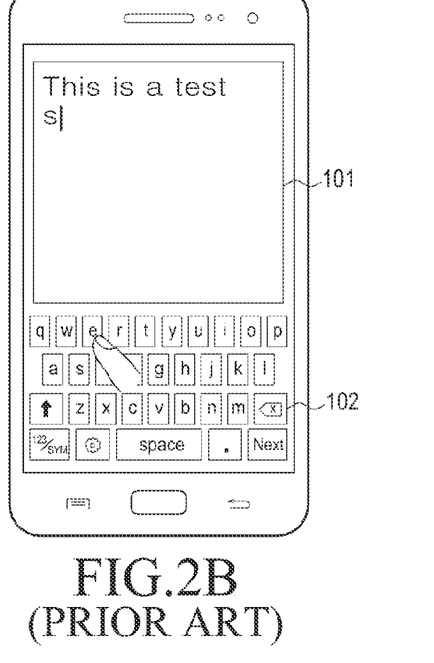
Figure 2C:
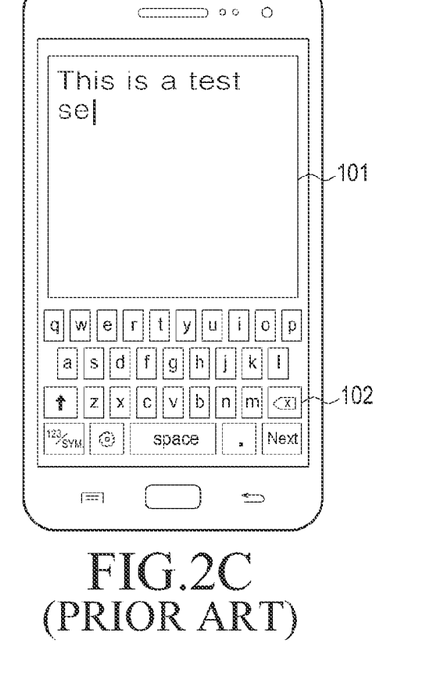
Figure 2D:
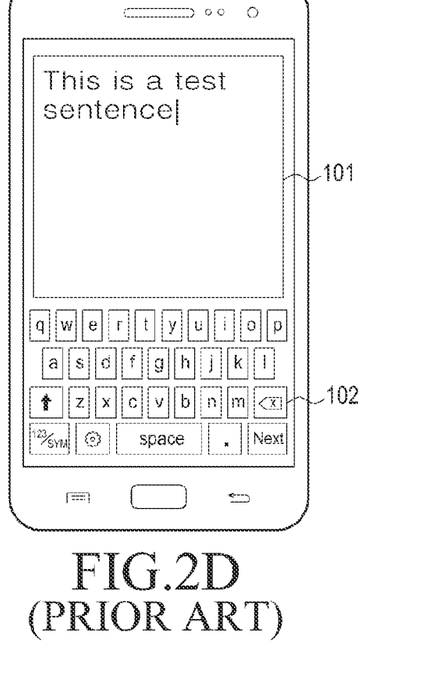

As illustrated in FIGS. 2A to 2D, in order to more quickly and conveniently input characters, a user may delete characters up to the mistyped character 103, as shown in FIG. 2B, by inputting a key (for example, a backspace key) 102 having a function of deleting characters, instead of moving the cursor to the rear of the mistyped character 103, while inputting characters using a keypad displayed on a mobile terminal, input the correct character as illustrated in FIG. 2C, and then input the rest of the characters, completing the character correction, as shown in FIG. 2D.

In this method for correcting mistyped characters, the user deletes the correctly typed characters in addition to the mistyped characters, and thus must re-input the correctly typed characters after correcting the typographical errors.

The above information is presented as background information only to assist with an understanding of the present invention.

SUMMARY OF THE INVENTION

An aspect of the present invention is to address at least the above-mentioned problems and/or disadvantages and to provide at least the advantages described below. Accordingly, an aspect of the present invention is to provide a method and apparatus for allowing a user to more conveniently and quickly correct a mistyped character, and to re-input the correctly typed characters.

In accordance with one aspect of the present invention, a method for inputting characters in a terminal is provided. The method includes receiving a first key input through a key input unit; storing at least one character corresponding to the first key input; displaying the stored at least one character in a first display area; removing the displayed at least one character from the first display area in response to a second key input received through the key input unit; displaying the removed at least one character in a second display area; receiving input of a selection of at least one character that is displayed in the second display area; and displaying the selected at least one character in the first display area.

In accordance with one aspect of the present invention, there an apparatus for inputting characters in a terminal is provided. The apparatus includes a key input unit configured to receive key input; a display configured to display data corresponding to the key input; and a character input processor configured to store at least one character corresponding to a first key input received through the key input unit, defining a first display area, provide, to the display, data configured to display the at least one character in the first display area, provide first data to the display in response to a second key input received through the key input unit, the first data being configured to display the first display area from which the least one character is deleted, and to display a second display area in which the deleted at least one character is displayed, and provide second data to the display if at least one character displayed in the second display area is selected, the second data being configured to display the selected at least one character in the first display area.

BRIEF DESCRIPTION OF THE DRAWINGS

The above and other aspects, features and advantages of certain embodiments of the present invention will be more apparent from the following description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. Throughout the drawings, like reference numerals will be understood to refer to like parts, components, and structures.

In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

The terms and words used in the following description and claims are not limited to their dictionary meanings, but are merely used to provide a clear and consistent understanding of the invention.

Herein, the singular forms "a," "an," and "the" include plural referents unless the context clearly dictates otherwise. Thus, for example, reference to "a component surface" includes reference to one or more of such surfaces.

Figure 3:
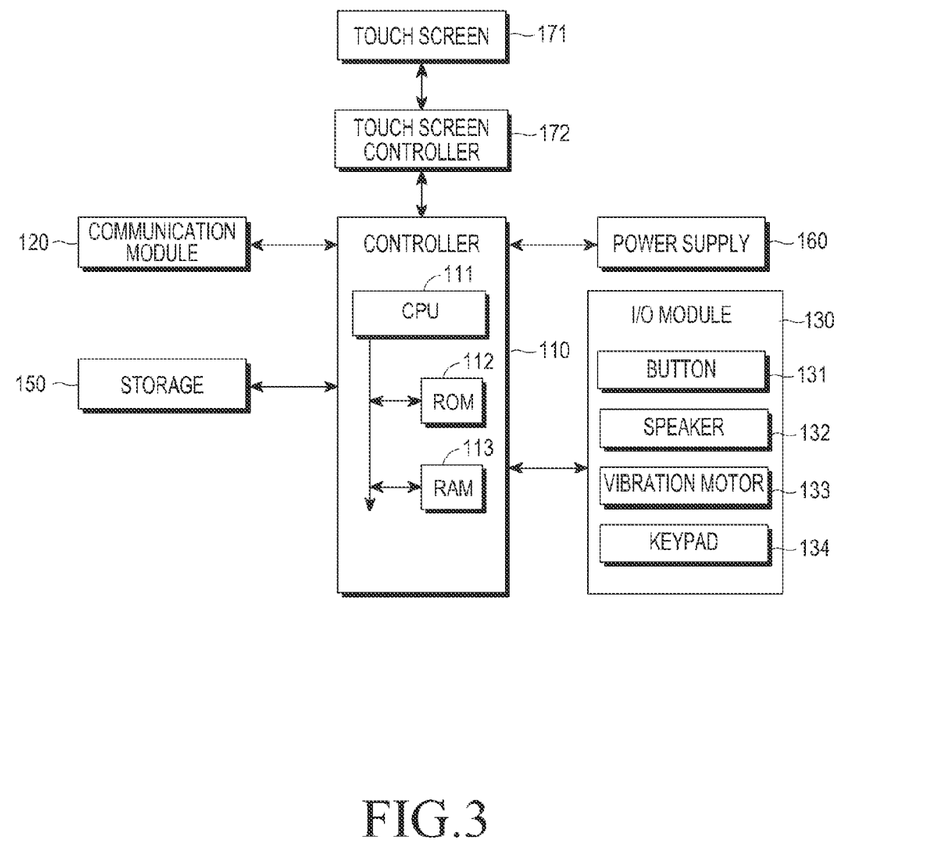
FIG. 3 is a schematic block diagram of a mobile terminal according to an embodiment of the present invention.

FIG. 3 is a schematic block diagram of a mobile terminal according to an embodiment of the present invention.

Referring to FIG. 3, a device (such as a mobile terminal, for example) 100 includes a controller 110, a communication module 120, an Input/Output (I/O) module 130, a storage 150, a power supply 160, a touch screen 171, and a touch screen controller 172.

The controller 110 includes a Central Processing Unit (CPU) 111, a Read Only Memory (ROM) 112 storing a control program for controlling the device 100, and a Random Access Memory (RAM) 113, which temporarily stores signals or data received from the outside of the device 100, or is used as a storage area for the operations performed in the device 100. The CPU 111, ROM 112 and RAM 113 may be interconnected via an internal bus. The controller 110 controls the communication module 120, the I/O module 130, the storage 150, the power supply 160, the touch screen 171, and the touch screen controller 172. The controller 110 may include a single core, or may include multiple cores such as in dual-core, triple-core, and quad-core configurations. The number of cores is subject to change depending on the characteristics of the terminal.

The communication module 120 may include, for example, a cellular module (not shown), a Wireless Local Area Network (WLAN) module (not shown), and/or a short-range communication module (not shown).

The cellular module is configured to connect the device 100 to an external device by mobile communication via at least one antenna (not shown), under a control of the controller 110. The cellular module exchanges wireless signals for voice calls, video calls, Short Message Service (SMS) messages and/or Multimedia Messaging Service (MMS) messages, with cellular phones (not shown), smart phones (not shown), tablet Personal Computers (PCs) (not shown) and/or other devices (not shown), whose phone numbers are stored or registered in the device 100.

The WLAN module, under control of the controller 110, may be connected to the Internet in a place where a wireless Access Point (AP) (not shown) is installed. The WLAN module supports the IEEE 802.11x WLAN standard defined by Institute of Electrical and Electronics Engineers (IEEE). The WLAN module may drive a Wi-Fi Positioning System (WPS) that identifies location information of terminal equipment with a WLAN module, using location information provided by a wireless AP to which the WLAN module is wirelessly connected.

The short-range communication module, a module that wirelessly handles short-range communications with the device 100 under a control of the controller 110, handles communication based on short-range communication protocols, such as Bluetooth®, Infrared Data Association (IrDA), WiFi-Direct, and Near Field Communication (NFC).

The I/O module 130 includes input/output devices, such as a button 131, a speaker 132, and/or a vibration motor 133.

The button 131 may be formed on the front, side and/or rear of the housing of the device 100, and may include at least one of a power/lock button (not shown), a volume button (not shown), a menu button (not shown), a home button (not shown), a back button (not shown), and a search button (not shown).

The speaker 132, under a control of the controller 110, outputs the sounds corresponding to various signals (for example, wireless signals, broadcast signals, etc.) from the cellular module, the WLAN module and the short-range communication module, to the outside of the device 100. One or multiple speakers 132 may be formed in one or more positions in a housing of the device 100.

The vibration motor 133 converts electrical signals into mechanical vibrations under a control of the controller 110. One or more vibration motors 133 may be formed in the housing of the device 100.

The speaker 132 and the vibration motor 133 may operate depending on the set state of a volume-operating mode of the device 100. For example, the volume-operating mode of the device 100 may be set and operated as a sound mode, a vibration mode, a sound & vibration mode, and a silent mode, for example. Based on the set volume-operating mode, the controller 110 outputs signals instructing the operation of the speaker 132 or the vibration motor 133 depending on the function performed by the device 100. For example, the controller 110 may output a sound signal and a vibration signal to the speaker 132 and the vibration motor 133, respectively, in response to a touch action by the user on the touch screen 171, and/or a continuous movement of a touch on the touch screen 171.

The storage 150, under control of the controller 110, stores signals and/or data that are input/output with respect to corresponding operations of the communication module 120, the I/O module 130, and the touch screen 171. The storage 150 also stores a variety of applications and a control program for control of the device 100 or the controller 110.

The term 'storage' as used herein may include the storage 150, the ROM 112 and RAM 113 in the controller 110, and a memory card (not shown) (for example, a Secure Digital (SD) card, a memory stick) mounted in the device 100. The storage may include various forms of storage, such as a non-volatile memory, a volatile memory, a Hard Disk Drive (HDD), a Solid State Drive (SSD), etc.

The power supply 160, under control of the controller 110, supplies power to at least one rechargeable battery (not shown) mounted in the housing of the device 100. The at least one battery (not shown) supplies power to the device 100. The power supply 160 supplies power received from the external power source (not shown) to the device 100 through a wired cable that is connected to a connector mounted in the device 100. The power supply 160 supplies, to the device 100, power that is wirelessly received from the external power source according to a wireless charging technology.

The touch screen 171 displays User Interfaces (UIs) corresponding to various services (for example, calls, data transmission, etc.) for the user, based on an Operation System (OS) of the device 100. The touch screen 171 may transfer an analog signal corresponding to at least one touch entered on a UI, to the touch screen controller 172. The touch screen 171 receives at least one touch input through the user's body (e.g., fingers including the thumb) and/or a touch input means (e.g., a stylus pen). The touch screen 171 may receive a continuous movement input of at least one touch. The touch screen 171 may transfer an analog signal corresponding to a continuous movement of an input touch, to the touch screen controller 172.

The touch screen 171 may include a resistive type, a capacitive type, an infrared type, or an acoustic wave type touch screen, for example.

The touch screen controller 172 controls output values of the touch screen 171 so that the display data provided from the controller 110 may be displayed on the touch screen 171. The touch screen controller 172 converts analog signals received from the touch screen 171 into digital signals (e.g., X/Y coordinates) and transfers the digital signals to the controller 110. The controller 110 controls the touch screen 171 using the digital signals received from the touch screen controller 172. For example, in response to a touch event or a hovering event, the controller 110 selects or executes a related shortcut icon (not shown) displayed on the touch screen 171. The touch screen controller 172 may be incorporated into the controller 110.

Figure 4:
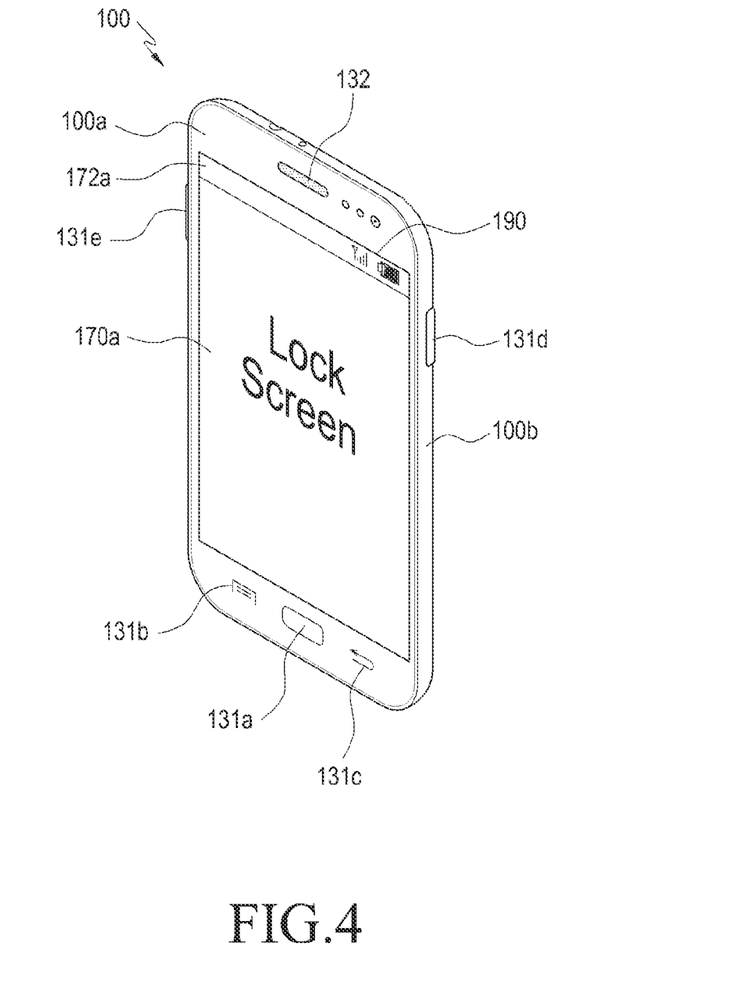
FIG. 4 illustrates an example of a front perspective view of a mobile terminal according to an embodiment of the present invention.
Figure 5:
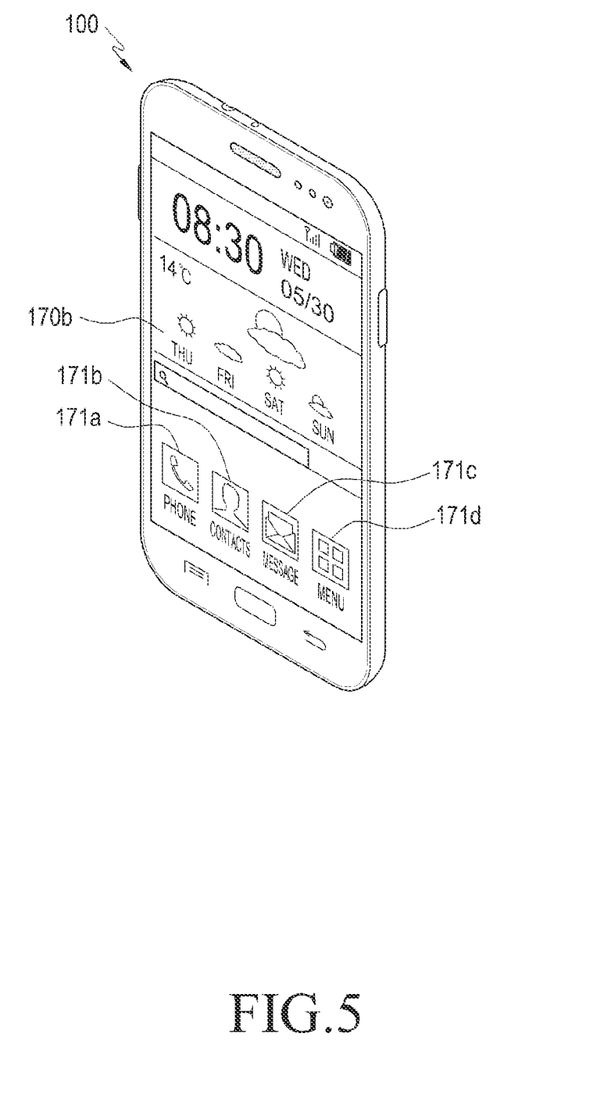
FIG. 5 illustrates another example of a front perspective view of a mobile terminal according to an embodiment of the present invention.

FIGS. 4 and 5 illustrate different examples of a front perspective view of a mobile terminal according to an embodiment of the present invention.

Referring to FIGS. 4 and 5, the touch screen 171 is mounted at the center of the front 100*a* of the device 100. The touch screen 171 may occupy most of the front 100*a* of the device 100. In the example of FIG. 4, a lock screen 170*a* is displayed on the touch screen 171. The lock screen 170*a* is the first screen that is displayed on the touch screen 171 when the device 100 is powered on. The lock screen 170*a* provides an environment in which the user may access the device 100 by entering security information (e.g., a password, a security pattern, etc.) that is set by the user. The controller 110 checks the validity of the security information entered by the user, and then may unlocks the lock screen 170*a*, according to the check results, by switching to a home screen 170*b*, as shown in FIG. 5.

The lock screen 170*a* may be configured to receive security information such as a password or a security pattern from the user. The lock screen 170*a* may also be configured to switch to the home screen 170*b* upon receiving a touch input or a drag input by the user without receiving the password or the security pattern, if the user does not set separate security information.

The home screen 170*b* may include multiple different home screens presented as multiple pages. Among the multiple pages home screens 170*b*, a first home screen displayed may be a main home screen. The home screen 170*b* illustrated in FIG. 5 displays shortcut icons 171*a*, 171*b* and 171*c* for executing frequently used applications, a main menu switch key 171*d*, the time, the weather, etc. The main menu switch key 171*d* displays a menu screen on the touch screen 171. The top of the touch screen 171 includes a status bar 172*a*, which indicates various states of the device 100, such as the battery charging state, a strength of a received signal, the current time and the volume operating mode.

Referring back to FIG. 4, a home button 131*a*, a menu button 131*b* and a back button 131*c* are positioned below the touch screen 171.

Basically, the home button 131*a* is used to display the main home screen on the touch screen 171. For example, if the home button 131*a* is touched while a home screen other than the main home screen, or the menu screen is displayed on the touch screen 171, the main home screen is displayed on the touch screen 171. If the home button 131*a* is touched while applications are executed on the touch screen 171, the main home screen, such as in the example of FIG. 5, is displayed on the touch screen 171. The home button 131*a* may also be used to display recently used applications or a task manager on the touch screen 171.

The menu button 131*b* is used to provide a connection menu that can be used on the touch screen 171. The connection menu may include an add widget menu, a wallpaper change menu, a search menu, an edit menu, a preference menu, etc.

The back button 131*c* is used to display the screen that was displayed just before the current screen, or to exit the most recently used application.

The speaker 132 may be mounted at the top center of the front 100*a* of the device 100. A power/reset button 131*d*, a volume button 131*e*, etc. may be mounted on a side of the device 100, such as side 100*b* as illustrate in FIG. 4.

Although the above-described embodiments of the present invention refer to a device 100 having the touch screen 171 as a display device, which includes a display panel for outputting display signals and a touch screen panel capable of detecting user's inputs, and the touch screen controller 172 for controlling the touch screen 171, the present invention is not limited thereto. For example, the device 100 may have, instead of a touch screen, a display panel as a display device, and a separate input means such as a keypad, for example.

Embodiments of the present invention may be implemented in the form of various computer-executable program commands and recorded in computer-readable media. The computer-readable media may include program commands, data files, data structures and the like independently or in combination. The program commands recorded in the media may be the commands specially designed and configured for the present invention, or may be based upon currently available commands well-known to those of ordinary skill in the field of computer software.

Embodiments of the present invention may be implemented in the form of program commands and stored in the storage 150 of the device 100, and the program commands may be temporarily stored in the RAM 113 embedded in the controller 110 to execute according to embodiments of the present invention. Accordingly, the controller may control the hardware components included in the device 100 to correspond to the program commands implemented according to the exemplary embodiments of the present invention, temporarily or continuously store the data generated during execution of the exemplary embodiments of the present invention in the storage 150, and provide, to the touch screen controller 172, the UIs needed for execution according to embodiments of the present invention.

Figure 6:
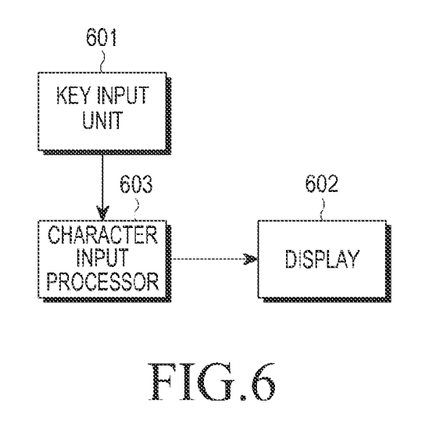
FIG. 6 is a block diagram of a character input apparatus according to an embodiment of the present invention.
Figure 7:
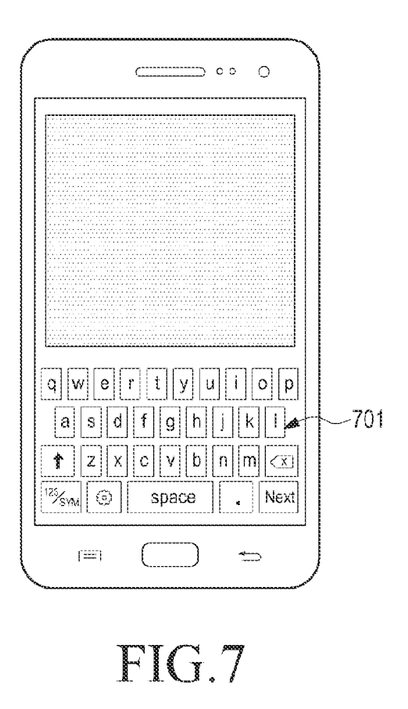
FIG. 7 illustrates a touch input key's Graphic User Interface (GUI) displayed on a character input apparatus according to an embodiment of the present invention.
Figure 8:
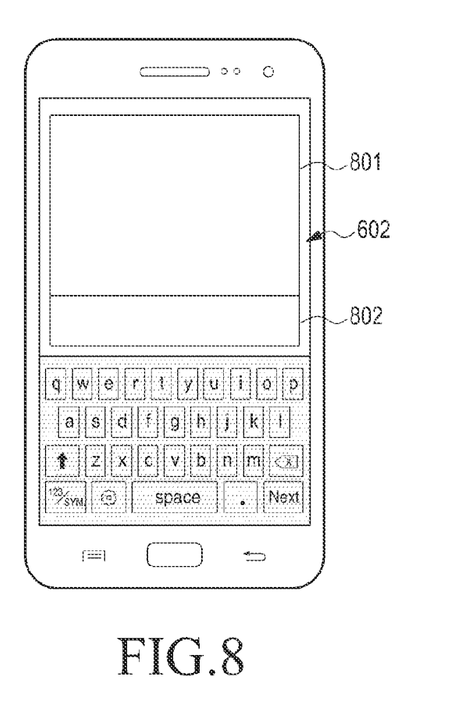
FIG. 8 illustrates a character input window displayed by a character input processor mounted in a character input apparatus according to an embodiment of the present invention.

FIG. 6 is a block diagram of a character input apparatus according to an embodiment of the present invention. FIG. 7 illustrates a touch input key's Graphic User Interface (GUI) displayed on a character input apparatus according to an embodiment of the present invention. FIG. 8 illustrates a character input window displayed by a character input processor mounted in a character input apparatus according to an embodiment of the present invention.

Referring to FIGS. 6-8, the character input apparatus includes a key input unit for identifying and handling key inputs to the terminal, a display 602 for displaying input data, and a character input processor 603 for handling character inputs.

The key input unit 601 may be, for example, the keypad 134 in FIG. 3, which is used to identify a key input by the user and detect an input corresponding to the key. The key input unit 601 may also be a key input module (not shown) that displays a touch input key's Graphic User Interface (GUI) on the display 602, and identifies a key allocated to an area selected by the user, by means of the touch screen 171 and the touch screen controller 172 in FIG. 3. In this case, the key input module may be incorporated into the controller 110, and may provide data for displaying a touch input key's GUI 701 illustrated in FIG. 7 to the touch screen controller (or a display controller) 172 so that the touch input key's GUI 701 may be displayed on the display 602. The key input module receives coordinates of the area, in which a touch input event occurs, through the touch screen 171 and the touch screen controller 172 in FIG. 3, detects a key input allocated to the area corresponding to the coordinates, and provides the detected key input to the character input processor 603.

If the a character input apparatus according to an embodiment of the present invention is mounted in a device such as a Personal Computer (PC), a laptop computer, etc., the key input unit 601 may be a keyboard that is connected to the device.

The key input unit 601 separately recognizes input from each of a first key set and a second key set. The first key set, which is a set of keys for inputting characters, may be a set of keys to which characters are allocated (e.g., a set of keys to which a, b, c, d, ... x, y, z, 1, 2, 3, ... 8, 9, 0 are allocated). The second key set, which is a set of keys set for deleting input characters, may be a set of keys including a Delete key and a Backspace key, for example.

The display 602, a unit for displaying data provided from the terminal, may include, for example, the touch screen 171 and the touch screen controller 172 illustrated in FIG. 3. In particular, the display 602 displays the data provided from the character input processor 603.

The character input processor 603, which handles character inputs to the terminal, may be incorporated into the controller 110. As an application requiring character entry is executed, the character input processor 603 may start its operation. The character input processor 603 generates data for displaying a first display area 801 and a second display area 802 illustrated in FIG. 8, and provides the generated data to the touch screen controller 172. The character input processor 603 generates data configured to output, to the first display area 801 and the second display area 802, the data corresponding to the input to the key input unit 601, and provides the generated data to the touch screen controller 172.

Specifically, the character input processor 603 generates data configured to display characters stored in a first memory area in the first display area 801 and to display characters stored in a second memory area in the second display area 802, and provides the generated data to the touch screen controller 172. Upon receiving the first key set, the character input processor 603 generates data configured to store characters corresponding to inputs from the first key set in the first memory area and to display the characters stored in the first memory area in the first display area 801, and provides the generated data to the touch screen controller 172. Upon receiving the second key set, the character input processor 603 generates data configured to move the characters stored in the first memory area to the second memory area and to remove from the first display area 801 the character deleted from the first memory area, generates data configured to display the characters moved to the second memory area in the second display area 802, and provides the generated data to the touch screen controller 172.

The key input unit 601 selects, according to user input, at least one character displayed in the second display area 802, and the character input processor 603 generates data configured to move the character selected by the key input unit 601 from the second memory area to the first memory area and to display the character moved to the first memory area in the first display area 801, generates data configured to display the characters deleted from the first memory area in the second display area 802, and provides the generated data to the touch screen controller 172.

The key input unit 601 may be configured to, according to user input, select at least one of the characters displayed in the second display area 802 one-by-one while the character input processor 603 displays the characters selected by the key input unit 601 in the first display area 801 one-by-one, and remove the selected characters from the second display area 802 one-by-one. As the key input unit 601 selects the character that is first displayed in the first display area 802, from among the multiple characters displayed in the second display area 802, the character input processor 603 removes all the characters displayed in the second display area 802.

According to an alternative embodiment of the present invention, the key input unit 601 selects, according to user input, the second display area 802. As the second display area 802 is selected by the key input unit 601, the character input processor 603 moves all characters displayed in the second display area 802 except for the character last displayed in the second display area 802, from the second memory area to the first memory area, and displays all characters stored in the first memory area in the first display area 801. At the same time, the character input processor 603 removes all the characters displayed in the second display area 802.

Figure 9:
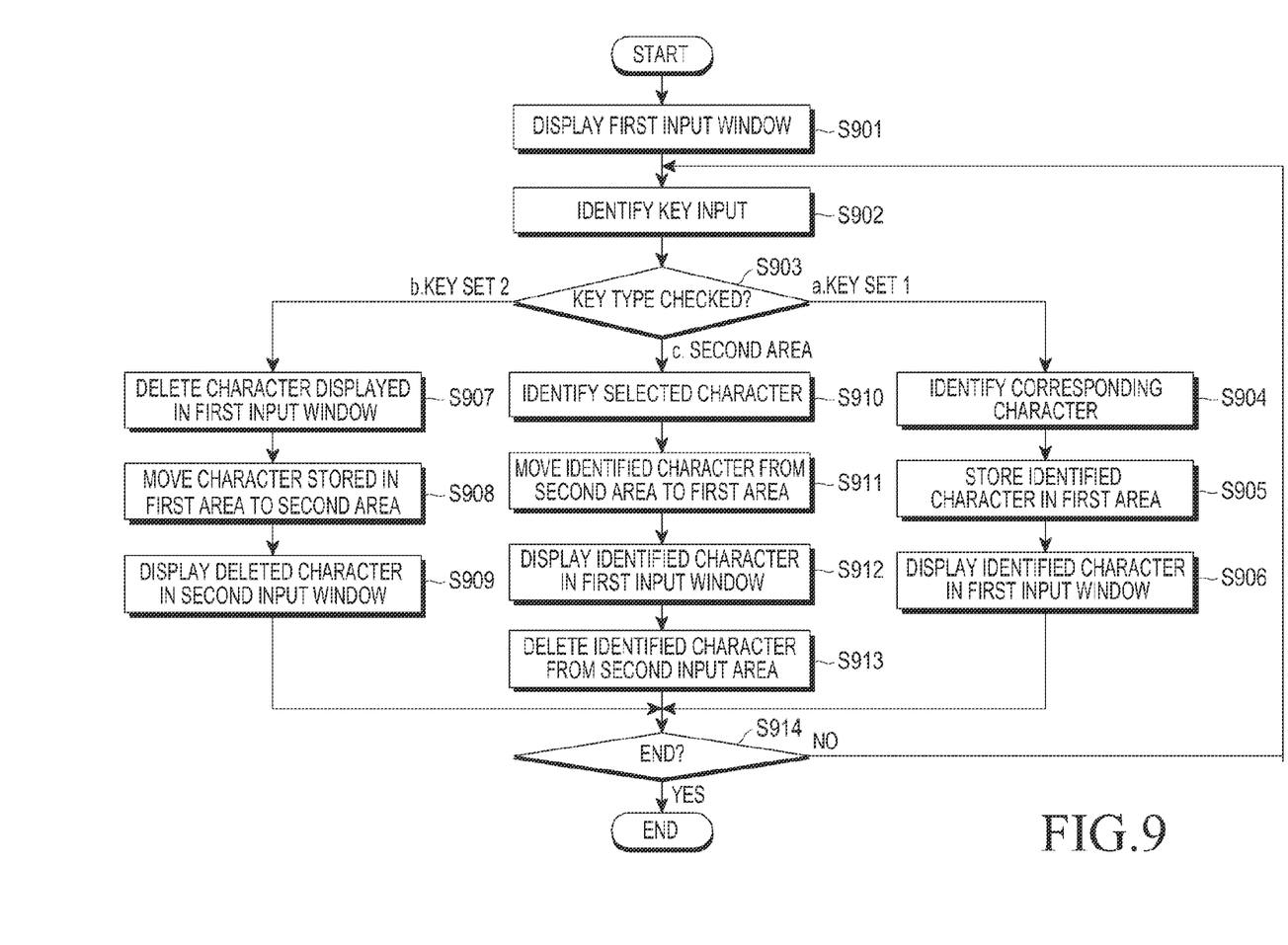
FIG. 9 is a flowchart illustrating a character input method according to an embodiment of the present invention.

FIG. 9 is a flowchart illustrating a character input method according to an embodiment of the present invention.

Referring to FIG. 9, an operation of the character input method starts as an application requiring character entry is executed. The character input processor 603, the touch screen controller 172, and the display 602 operate to display the first display area on the display 602, in step S901.

Next, as the key input unit 601 identifies a key input, in step S902, the key input unit 601 checks the type of the input key in step S903.

If the type of the input key corresponds to the first key set (i.e., a set of keys to which characters such as Korean/English characters, numbers and special symbols, are allocated) (in 'a' of step S903), the character input processor 603 identifies a character corresponding to the input first key set, in step S904. The character input processor 603 stores the identified character in a first memory area, in step S905, and displays the stored character in the first display area 801, in step S906.

If the type of the input key corresponds to the second key set (i.e., a set of keys for deleting input characters, such as a Delete key and a Backspace key), in 'b' of step S903, the character input processor 603 deletes the associated character from the first display area 801 based on the function of the second key set, in step S907. For example, if the input key is a Backspace key included in the second key set, the character input processor 603 deletes the character that is located just in front of the cursor.

In step S908, the character input processor 603 moves the deleted character to a second memory area different from the first memory area, in which the identified character was stored, in step S905, and stores the moved character in the second memory area.

In step S909, the character input processor 603 displays the character stored in the second memory area in the second display area 802.

If the type of the input key is not included in either of the first key set and the second key set, and if the second display area 802 is selected (in 'c' of step S903), the character input processor 603 extracts a character corresponding to the selection of the second display area 802, in step S910. For example, the key input unit 601 may be configured to select at least one of the multiple characters displayed in the second display area 802, one-by-one, and the character input processor 603 extracts the character selected by the key input unit 601. As an alternative, the key input unit 601 may be configured to select the second display area 802. As the second display area 802 is selected by the key input unit 601, the character input processor 603 extracts all of the characters displayed in the second display area 802 except for the character last displayed in the second display area 802.

Next, in step S911, the character input processor 603 moves the character identified in step S910 from the second memory area back to the first memory area and stores the moved character in the first memory area. In step S912, the character input processor 603 displays, in the first display area 802, the character that has been moved from the second memory area to the first memory area and stored therein. In step S913, the character input processor 603 deletes, from the second display area 802, the character that was moved to the first memory area.

Since multiple characters may be input by the user, the character input apparatus may input and/or delete multiple characters by repeatedly performing steps S902 to S913. When an End key is input by the user in step S914, the character input apparatus ends the character input method. For example, the operation ends if an End key is input by the user, or based on other operations of a character input application that comply with the operating policies of the terminal. For example, the operating policies of the terminal may include, for example, the policy of exiting a character input application while the terminal is in a standby state or an inactive state without displaying the character input application on the display, or when the character input application is not continuously displayed on the display for a predetermined time.

FIGS. 10A to 10E illustrate character entry handled by a character input method according to an embodiment of the present invention. In the example described with respect to FIGS. 10A to 10E, English text is entered.

Referring to FIGS. 6 and 10A-10E, the character input processor 603 provides, to the touch screen controller 172, data for displaying the first display area 801 and data for displaying a cursor 1001 waiting for character entry in the first display area 801. The cursor 1001 is located at the rear of the input character. A user may move the position of the cursor 1001 by touching a part of the first display area 801 or by manipulating the key input unit 601.

Figure 10A:
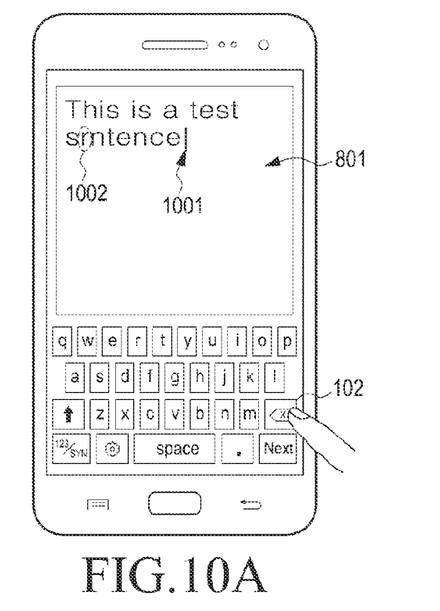
FIGS. 10A to 10E illustrate character entry handled by a character input method according to an embodiment of the present invention.

Thereafter, if a character is input by entering the first key set provided by the key input unit 601, the character input processor 603 displays the character corresponding to the entered first key set in the first display area 801, and stores the displayed character in the first memory area. By repeatedly proceeding with this process, the character input processor 603 and the key input unit 601 display multiple characters in the first display area 801 and store the displayed characters in the first memory area. As illustrated in FIG. 10A, the entered characters are displayed in the first display area 801.

In this character input process, if there is a mistyped character 1002 that needs to be corrected, a character correction process will be performed with respect to the entered characters.

The character correction may be performed in a variety of ways depending on the user's preference. Generally, the user deletes up to the mistyped character from the last entered character by entering a key included in the second key set (e.g., a Backspace key) and then re-enters the characters, or moves the cursor to the rear of the mistyped character and then enters a key included in the second key set (e.g., a Backspace key).

Since the latter method requires a key input operation for moving the cursor, the former method is commonly used. The present invention provides a method that is especially useful for users of the former method.

Figure 10B:
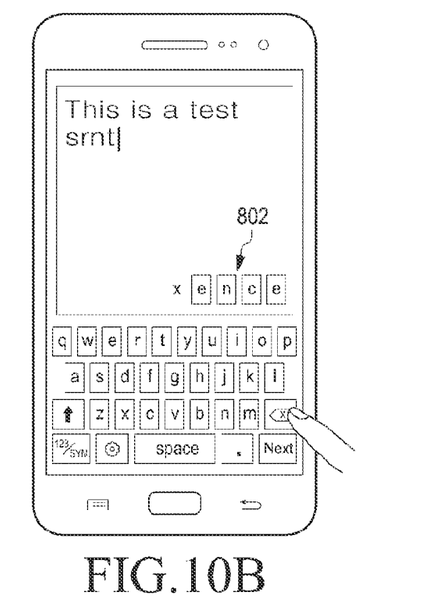
Figure 10C:
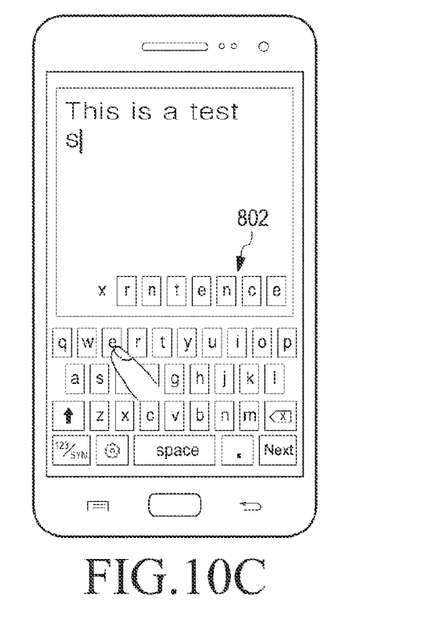
Figure 10D:
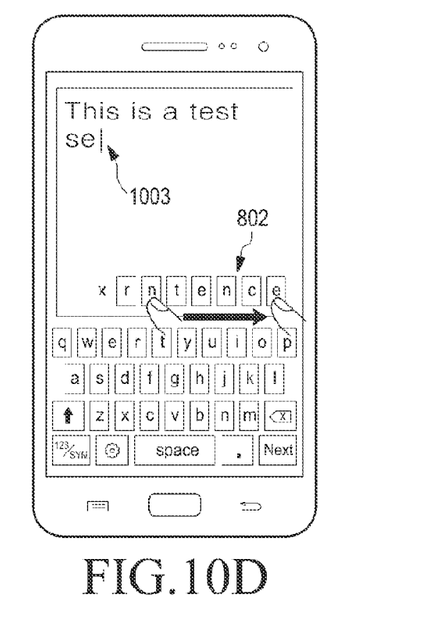

Specifically, as illustrated in FIG. 10B, according to an embodiment of the present invention, the characters entered in FIG. 10A are deleted beginning from the last entered character one by one, as the user enters the second key set (for example, a Backspace key) provided by the key input unit 601. Accordingly, the character input processor 603 deletes the characters corresponding to the areas selected by the key input unit 601 from the first display area 801 one-by-one. At the same time, the character input processor 603 sequentially generates and displays the characters removed from the first display area 801 in the second display area 802. By continuously proceeding with this operation, the character input processor 603 deletes up to the mistyped character 1002 from the first display area 801 as illustrated in FIG. 10C. Thereafter, the user replaces the mistyped character 1002 with a new character 1003, as illustrated in FIG. 10D.

Figure 10E:
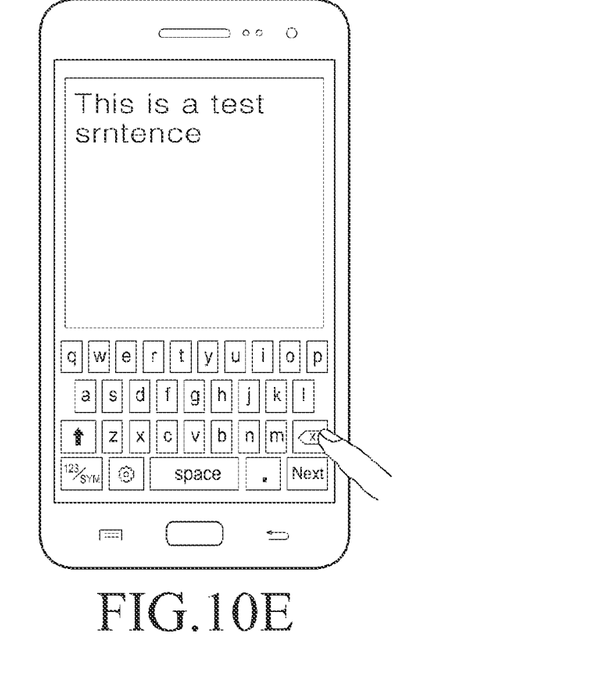

Thereafter, the user may select at least one of the characters displayed in the second display area 802 by manipulating the key input unit 601. The character input processor 603 displays the character selected by the key input unit 601 in the first display area 801, and at the same time, deletes the selected character from the second display area 802, as shown in FIG. 10E.

The key input unit 601 may select, according to user input, at least one of the characters displayed in the second display area 802 one-by-one. For example, the key input unit 601 may set (or define) the areas where the characters from among characters in the second key area are located, and allocate associated characters to the areas, allowing the user to individually enter the multiple characters displayed in the second display area 802. As the user selects a character to enter on the keypad, or touches an area where the character exists, the key input unit 601 individually receives the characters displayed in the second display area 802. Alternatively, the key input unit 601 may provide an environment in which, if the user touches areas where characters exist, the key input unit 601 continuously receives the characters in the touched areas. In other words, upon detecting a drag input for the areas where multiple characters exist, the key input unit 601 quickly displays the multiple characters allocated to their associated areas in the first display area 801.

As an alternative, the key input unit 601 may select the second display area 802 as a single area. As the second display area 802 is selected by the key input unit 601, the character input processor 603 displays, in the first display area 801, all of the characters displayed in the second display area 802 except for the character last displayed in the second display area 802. At the same time, the character input processor 603 removes all of the characters displayed in the second display area 802.

FIGS. 11A to 11E illustrate character entry handled by a character input method according to another embodiment of the present invention, in which a Korean (or Hangul) text is entered. Therefore, FIGS. 11A to 11E are similar in operation to FIGS. 10A to 10E, except that Hangul characters are used.

Referring to FIGS. 6 and 11A-11E, the character input processor 603 provides, to the touch screen controller 172, data for displaying the first display area 801 and data for displaying a cursor 1101 waiting for character entry in the first display area 801. The cursor 1101 is located at the rear of the input character, and is configured such that the user may move the position of the cursor 1001 by touching a part of the first display area or by manipulating the key input unit 601.

Figure 11A:
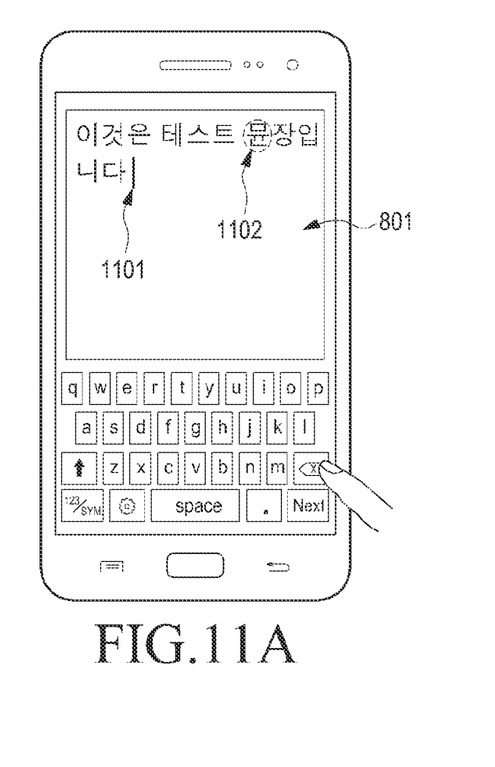
FIGS. 11A to 11E illustrate character entry handled by a character input method according to another embodiment of the present invention.

Thereafter, if a character is input by entering the first key set provided by the key input unit 601, the character input processor 603 displays the character corresponding to the entered first key set in the first display area 801, and stores the displayed character in the first memory area. By repeatedly performing this process, the character input processor 603 and the key input unit 601 display multiple characters in the first display area 801 and store the displayed characters in the first memory area. As illustrated in FIG. 11A, the entered characters are displayed in the first display area 801.

In this character input process, if there is a mistyped character 1102 that needs to be corrected, from among the entered characters, a character correction process will be performed.

The character correction may be performed in a variety of ways depending on the user's preference. As explained above with respect to FIGS. 10A-10E, generally, the user deletes up to the mistyped character from the last entered character by entering a key included in second key set (e.g., a Backspace key) and then re-enters the characters, or moves the cursor to the rear of the mistyped character and then enters a key included in the second key set (e.g., a Backspace key).

Since the latter method requires a key input operation for moving the cursor, the former method is commonly used. The present invention provides a method that is especially useful for users of the former method.

Figure 11B:
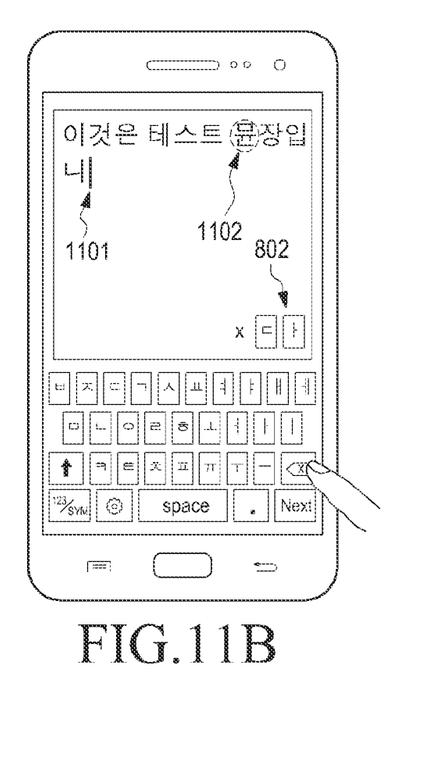

Specifically, as illustrated in FIG. 11B, according to an embodiment of the present invention, the characters entered in FIG. 11A are deleted beginning from the last entered character one by one, as the user enters the second key set (for example, a Backspace key) provided by the key input unit 601. Accordingly, the character input processor 603 deletes the characters corresponding to the areas selected by the key input unit 601 from the first display area 801 one-by-one. At the same time, the character input processor 603 sequentially generates and displays the characters removed from the first display area 801 in the second display area 802.

Hangul characters include consonants and vowels. Each Hangul character generally includes a combination of an initial sound, a medial sound and a final sound. Therefore, consonants and vowels are entered through the key input unit 601, and the character input processor 603 completes one character by combining the entered consonants and vowels based on the Hangul composition principle. After completing one character, the character input processor 603 completes the formation of the character, upon detecting entry of the next character. Upon detecting an operation for removing characters from the first display area 801 before the forming of the character is completed, the character input processor 603 operates to sequentially remove the characters in units of consonants and vowels, and upon detecting an operation for removing characters from the first display area 801 after the formation of the character is completed, the character input processor 603 operates to sequentially remove the characters in units of characters.

As an alternative, regardless of whether the formation of the character is completed, upon detecting an operation of removing characters from the first display area 801, the character input processor 603 may remove characters from the first display area in units of characters, in the order in which the characters are entered.

Figure 11C:
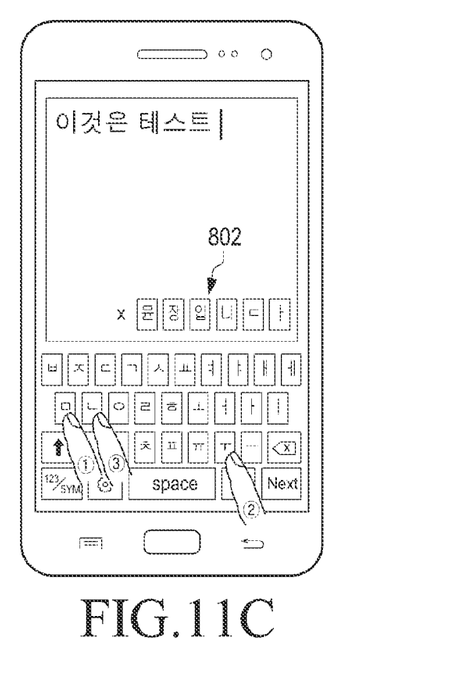
Figure 11D:
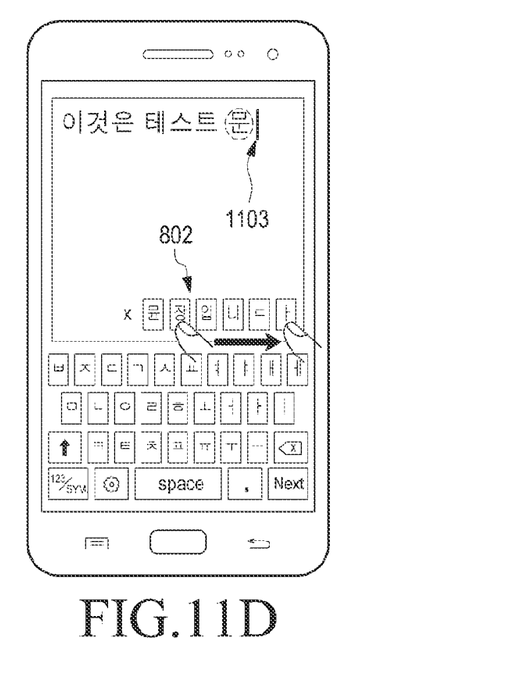

By continuously performing this operation, the character input processor 603 deletes up to the mistyped character 1102 from the first display area 801 as illustrated in FIG. 11C. Thereafter, the user replaces the mistyped character 1102 with a new character 1103 as illustrated in FIG. 11D.

Figure 11E:
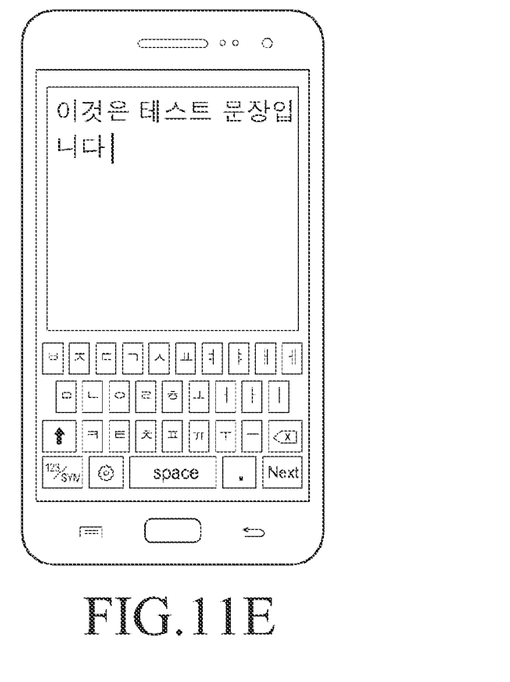

Thereafter, the user may select at least one of the characters displayed in the second display area 802 by manipulating the key input unit 601. The character input processor 603 displays the character selected by the key input unit 601 in the first display area 801, and at the same time, deletes the selected character from the second display area 802, as shown in FIG. 11E.

The key input unit 601 may select, according to user input, at least one of the characters displayed in the second display area 802 one by one. For example, the key input unit 601 may set (or define) the areas where the multiple characters are located, and allocate associated characters to the areas, allowing the user to individually enter the multiple characters displayed in the second display area 802. As the user selects a character to enter on the keypad, or touches an area where the character exists, the key input unit 601 individually receives the multiple characters displayed in the second display area 802. Alternatively, the key input unit 601 may provide an environment in which, if the user touches the areas where characters exist, the key input unit 601 may continuously receive the characters in the touched areas. In other words, upon detecting a drag input for the areas where multiple characters exist, the key input unit 601 may quickly display the multiple characters allocated to their associated areas in the first display area 801.

As an alternative, the key input unit 601 may select the second display area 802 as a single area. As the second display area 802 is selected by the key input unit 601, the character input processor 603 may display, in the first display area 801, all of the characters displayed in the second display area 802 except for the character last displayed in the second display area 802. At the same time, the character input processor 603 may remove all of the characters displayed in the second display area 802.

Embodiments of the present invention may be implemented in the form of various computer-executable program commands and recorded in computer-readable media. The computer-readable media may include program commands, data files, data structures and the like individually or in combination. The program commands recorded in the media may be the commands specially designed and configured for the present invention, or may be the available commands that are well known to those of ordinary skill in the field of computer software.

As is apparent from the foregoing description, the present invention allows the user to more easily correct the mistyped characters.

In addition, embodiments of the present invention allow users to more effectively input characters without the need to individually re-enter the characters that have been deleted during character correction.

Embodiments of the present invention also allow users to more conveniently re-enter the characters that have been deleted by mistake.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for inputting characters in a terminal, comprising:
   receiving a plurality of first key inputs through a key input unit;
   storing characters corresponding to the plurality of the first key inputs;
   displaying the characters in a first display area;
   removing at least one first character from the characters displayed in the first display area corresponding to a plurality of second key inputs received through the key input unit;
   individually displaying each of the removed at least one first character in a second display area in an order of a removal sequence of the removed at least one first character, only when each character is individually removed from the first display area;
   receiving an input of a selection of at least one second character among the removed at least one first character that is displayed in the second display area; and
   displaying each of the selected at least one second character in the first display area.

2. The method of claim 1, wherein the first key inputs are received through a character input key set of the key input unit.

3. The method of claim 1, wherein the second key inputs are received a character delete key set of the key input unit.

4. The method of claim 1, wherein displaying each of the selected at least one second character comprises deleting, from the second display area, the selected at least one second character.

5. The method of claim 1, wherein displaying each of the selected at least one second character comprises terminating the display of the second display area if the selected at least one second character includes a character that was first displayed in the second display area.

6. The method of claim 1, wherein receiving the input of the selection of at least one second character that is displayed in the second display area comprises:
   detecting a selection of the second display area; and
   receiving an input that selects all of the characters displayed in the second display area, except for a character that is last displayed in the second display area.

7. The method of claim 1, wherein storing characters corresponding to the plurality of the first key inputs comprises storing characters corresponding to the first key inputs in the first memory area, and
   wherein the removing the at least one first character from the characters displayed in the first display area comprises moving the removed at least one first character from a first memory area to a second memory area, and storing the moved at least one first character in the second memory area.

8. The method of claim 7, wherein displaying each of the selected at least one second character in the first display area comprises moving the selected at least one second character from the second memory area to the first memory area and storing the moved at least one second character in the first memory area.

9. An apparatus for inputting characters in a terminal, comprising:
   a key input unit configured to receive key input;
   a display configured to display characters corresponding to the key input; and
   a character input processor configured to:
   store characters corresponding to a plurality of first key inputs received through the key input unit,
   display the characters in a first display area,
   remove at least one first character from the characters displayed in the first display area corresponding to a plurality of second key inputs received through the key input unit,
   individually display each of the removed at least one first character in a second display area in an order of a removal sequence of the removed at least one first character, only when each character is individually removed from the first display area,
   receive an input of a selection of at least one second character among the removed at least one first character that is displayed in the second display area, and
   display each of the selected at least one second character in the first display area.

10. The apparatus of claim 9, wherein the first key inputs are received through a character input key set of the key input unit.

11. The apparatus of claim 9, wherein the second key inputs are received through a character delete key set of the key input unit.

12. The apparatus of claim 9, wherein the character input processor is configured to provide, to the display, data that is configured to delete, from the second display area, the selected at least one second character.

13. The apparatus of claim 9, wherein if the selected at least one second character includes a character that was first displayed in the second display area, the character input processor is configured to terminate the display of the second display area.

14. The apparatus of claim 9, wherein the character input processor is configured to:
   select all of the characters displayed in the second display area if the second display area is selected, and
   select at least one character except for a character that is last displayed in the second display area.

15. The apparatus of claim 9, wherein the character input processor is configured to move the removed at least one first character from a first memory area to a second memory area, and store the moved at least one first character in the second memory area.

16. The apparatus of claim 15, wherein the character input processor is configured to move the selected at least one second character from the second memory area to the first memory area, and store the moved at least one second character in the first memory area.

* * * * *